United States Patent [19]

Chaires et al.

[11] 3,925,761

[45] Dec. 9, 1975

[54] BINARY REFERENCE MATRIX FOR A CHARACTER RECOGNITION MACHINE

[75] Inventors: Anne Marie Chaires, Lanham; Jean Marie Ciconte, Rockville; Allen Harold Ett, Bethesda; John Joseph Hilliard, Potomac; Walter Steven Rosenbaum, Silver Spring, all of Md.

[73] Assignee: International Business Machines Corporation, Armonk, N.Y.

[22] Filed: Aug. 2, 1974

[21] Appl. No.: 494,251

[52] U.S. Cl. .................. 340/146.3 WD; 179/1 SA; 340/146.3 MA

[51] Int. Cl.² .......................................... G06K 9/00

[58] Field of Search ............ 340/146.3 WD, 172.5, MA, 340/146.3 MA, 173 SP, 173 AM, 173 R; 179/1 SA, 1 SB

[56] References Cited

UNITED STATES PATENTS 3,633,178 1/1972 Zopf ................................ 340/172.5

OTHER PUBLICATIONS

Giangardella et al., "Spelling Correction By Vector Representation Using A Digital Computer," *IEEE Transactions on Eng. Writing & Speech*, Vol. EWS–10, No. 2, Dec. 1967, pp. 57–62.

*Primary Examiner*—Leo H. Boudreau

*Attorney, Agent, or Firm*—John E. Hoel; John W. Henderson, Jr.

[57] ABSTRACT

A binary reference matrix apparatus is diclosed for verifying input alpha words from a character recognition machine as valid linguistic expressions. The organization of the binary reference matrix is based upon the character transfer function of the character recognition machine. The alphabetic character stream for each word scanned by the character recognition machine, is mapped into a vector representation through the assignment of a unique numeric value for each letter in the alphabet. The vector magnitude and angle so calculated constitute the address data for accessing the binary reference matrix. The point accessed in the matrix will have a binary value of 1 if the scanned word is valid and will have a binary value of 0 if the scanned word is invalid. The organization of the binary reference matrix minimizes the size of the array needed for accurate verification by choosing numerical values for the alphabetic characters in an inverse proportion to the characters read reliability in the character recognition machine, as determined by the empirical measurement of the character recognition machine, character transfer function.

3 Claims, 5 Drawing Figures

ANGLE RANGE

| | BYTE NO. | BIT POSITION | | | | | | | |
|---|---|---|---|---|---|---|---|---|---|
| | | 1 | 2 | 3 | 4 | 5 | 6 | 7 | 8 |
| | 1 | 0 | 0 | 0 | 0 | 0 | 0 | 0 | 0 |
| | 2 | 0 | 0 | 0 | 0 | 0 | 0 | 0 | 0 |
| | 3 | 0 | 0 | 0 | 0 | 0 | 0 | 0 | 0 |
| | 4 | 0 | 0 | 0 | 0 | 0 | 0 | 0 | 0 |
| MAGNITUDE | 7403 | 0 | 1 | 0 | 0 | 0 | 0 | 1 | 0 |
| | 7404 | 0 | 0 | 0 | 1 | 0 | 0 | 0 | 0 |
| | 7405 | 0 | 1 | 0 | 0 | 0 | 1 | 0 | 0 |
| | 9997 | 0 | 0 | 0 | 0 | 0 | 0 | 0 | 0 |
| | 9998 | 0 | 0 | 0 | 0 | 0 | 0 | 0 | 0 |
| | 10000 | 0 | 0 | 0 | 0 | 0 | 0 | 0 | 0 |

BINARY REFERENCE MATRIX FOR A CHARACTER RECOGNITION MACHINE

FIELD OF THE INVENTION

The invention disclosed herein relates to data processing devices and more particularly relates to post processing devices for character recognition machines, speach analyzers, and keyboards.

BACKGROUND OF THE INVENTION

From their inception, optical character recognition machines have had the potential for use in general text-processing applications. Their input processing rate far exceeds that of key punch/typewriter input and their output is in machine readable form. However, in spite of these important attributes, optical character recognition machines have made only minor inroads in the overall text-processing field. This may be based in a large part upon the problems of erroneous misreads when a variety of fonts and formats are used.

When multi-font nonformatted optical character recognition is attempted, a series of problems arise, which are not significant in single font optical character recognition. These problems stem from the highly error-prone character recognition environment which is created when the OCR operation is performed over many different alphabetic and numeric fonts with minimum control exercised over text conventions and typographical print quality. When scanning such text, discrimination between confusable character geometries causes a nominal 5% character recognition error rate.

A threshold problem in post-processing of the output recognition stream from an optical character reader is presented by the necessity of executing a quick comparison of the output word with a dictionary of acceptable words and generating a go/no go signal indicating the presence or absence of a conventional word.

Attempts have been made in the prior art to formulate an efficient means for converting the information and an alpha word to a significant address for storage means so as to access information as to whether that output word was in fact correctly spelled. For example, J. J. Giangardello, disclosed in the IFEE Transactions on Engineering Writing and Speech, Vol. EWS-10, No. 2, December 1967, page 57 in an article entitled "Spelling Correction by Vector Representation Using a Digital Computer", discloses the use of vector representation of alpha words by assigning the numbers 1 through 26 to the letters "A" through "Z" respectively and calculating a vector magnitude and angle for accessing the word from a memory in a general purpose computer. This disclosure, suffers from a defect which is typical of the prior art, namely that the conversion of the garbled word to be examined into a key address results in an ambiguous access. The vector address generated and randomly access an occupied or valid address for one or more dictionary words without any of the accessed dictionary words corresponding to the intended word which was garbled into the word under examination. What is needed in the art is an apparatus which generates address vectors for words under examination, which have minimum ambiguity, and yet maintain the size of the reference matrix within reasonable bounds.

OBJECTS OF THE INVENTION

It is an object of the invention to detect whether a word in the output recognition stream of a character recognizer has been misread, in an improved manner.

It is an additional object of the invention to detect whether a word in the output recognition stream of a character recognizer matches one of a plurality of words in a stored dictionary of correct words, in an improved manner.

SUMMARY OF THE INVENTION

These and other objects of the invention are accomplished by the binary reference matrix invention which verifies input alpha words as valid linguistic expressions from a character recognizer having a character transfer function. The apparatus comprises a two-dimensional read only storage array, each bit position of which has the potential to represent a valid linguistic expression. A first-dimensional accessing means is connected to the read only storage, for addressing the individual bit positions based upon values assigned to the characters of which the input alpha word is composed. A second-dimensional accessing means connected to the read only storage, addresses the individual bit positions based upon relative position of the characters of which the input alpha word is composed. The firstdimensional accessing means calculates the first-dimensional address as a vector magnitude. The second-dimensional accessing means calculates the second-dimensional address as a vector angle arcsecant. The binary matrix is organized so as to minimize the size of the array needed for accurate verification by choosing numeric values of the alphabetic characters in inverse proportion to the character recognizer read reliability. This read reliability is determined by empirical measurement of the character recognizers character transfer function. The character transfer function is expressed as a series of equations representing each characters probability of being confused into a false output character. These equations for the character transfer function are solved for the optimum character value set which assigns low numeric values to highly reliable characters and high numeric values to less reliable characters. The optimum character value set causes alpha words having reliable characters to have relatively low vector magnitude and alpha words having successively less reliable characters to have a correspondingly higher vector magnitude. Thus the read only storage apparatus has an organization such that the population of the matrix is rendered more sparse for bits representing alpha words having a higher probability of being confused into a false output word. Thus an input alpha word which is potentially in error can be verified by outputting a bit signal from the binary array corresponding to the point address by the first and second accessing means. The apparatus accomplishes an unambiguous determination of the correctness of a word in the output recognition stream, in a more efficient manner and with a more simplified apparatus than the prior art.

The apparatus may also be applied to the detection of correct words in the phoneme output recognition stream from a speech analyzer. The apparatus may also be applied to the detection of conventional typing errors in words typed on a keyboard.

DESCRIPTION OF THE DRAWINGS

The foregoing and other objects, features and advantages of the invention will be apparent from the following more particular description of the preferred embodiments of the invention, as illustrated in the accompanying drawings.

DISCUSSION OF THE PREFERRED EMBODIMENT

Theory of Operation

Figures 1, 4:
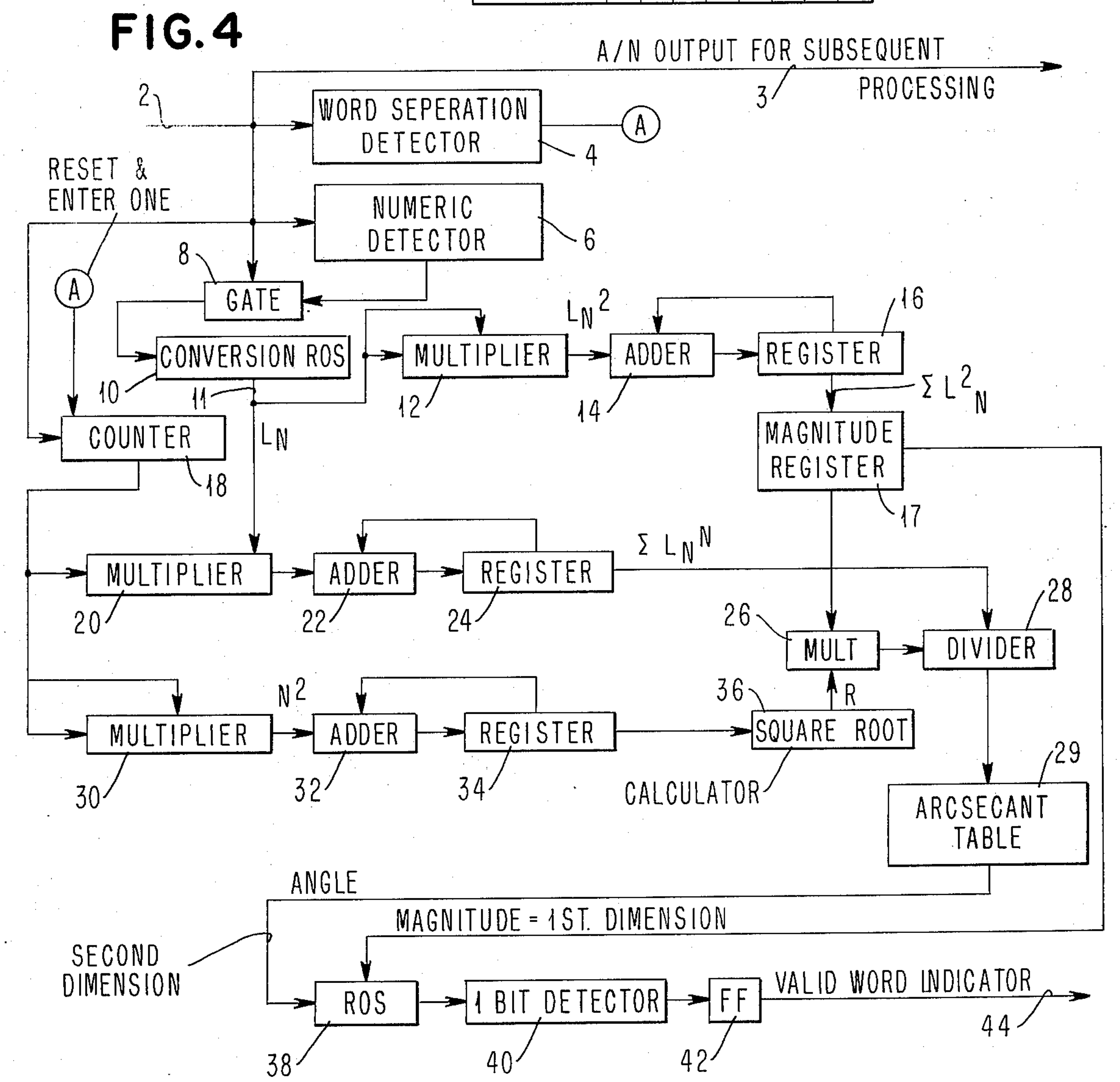
FIG. 4 shows a binary reference matrix apparatus invention.
FIG. 1 is a digital map of the read only storage organization in the binary reference matrix.

In a Contextual Word Recognition Post Processor, OCR Word Verification can be performed by means of the Binary Reference Matrix (BRM). The BRM approach was conceived as a highly efficient, low-storage approach to validating whether a word scanned by the OCR was read correctly; i.e., without character misread errors. Logically, the BRM must contain a representation in some manner of all words which might be anticipated in documents scanned by the OCR. This list of valid linguistic expressions may, at times, be even broader than the Webster's Dictionary. Therefore, conventional storage, access and search techniques against the OCR dictionary may not be acceptable, particularly in a real-time application. The goal of the verification technique is to minimize storage and search time for a large dictionary associated with an OCR application.

The BRM is a specialized application of the Alpha Word Vector Representation (AWVR) technique. The mechanics of the technique are shown in Table 1.

Table 1

Numeric Extraction of Alpha Field
A = 1, B = 2, C = 3, D = 4, E = 5, F = 6, G = 7,
H = 8, I = 9, J = 10, ...., Z = 26

Step 1

Vector Mapping CORNWALL → (3, 15, 18, 14, 23, 1, 12, 12)

Step 2

Vector Attributes (3, 15, 18, 14, 23, 1, 12, 12) → Magnitude, Angle
Magnitude = Function of characters in word $$\sum_{N=1}^{M} L_n^2 = (3)^2+(15)^2+(18)^2+(14)^2+(23)^2+(1)^2+(12)^2+(12)^2 = 1572 = Y^2$$

Angle = Function of Character Position $$= \sec^{-1} \frac{|Y|\,|R|}{\Sigma L_N N} = 83.7392 \text{ Degrees}$$

where R is the reference vector for each word length (M) with attributes (1, 2, 3, . . . , M) and with $|R| = \sqrt{1^2 + 2^2 + 3^2 \ldots M^2}$ as one possible reference vector configuration.

Basically the underlying rationale of the AWVR is that any word or character string can be mapped into a vector representation by assigning a unique numeric value to each letter in the alphabet. One of the most direct and intuitive assignment schemes would be designating A=1, B=2, C=3 . . . , Z=26. Any vector representation of a word so generated would, in turn, be uniquely reconstitutable in terms of the linear algebra vector attributes of magnitude and angle. Where:

a. Magnitude reflects word character contents
b. Angle reflects relative positioning of characters within the word.

It should be noted at this point that just using a magnitude/angle representation, any length alpha word may be represented uniquely by using only four bytes of storage.

The ability to transform an alpha word list into its vectorial image may be looked upon as the initial phase of BRM generation. Next, it is necessary to use the vector representation in an efficient manner for verification. The BRM itself is the array which results when valid magnitude/angle combinations are mapped into a matrix type display. This, in essence, allows further compaction of what in its vectorial form was already a highly compact version of the original alpha word list. The BRM, therefore, is a logical arrangement of storage which associates a magnitude value and angle segment range with each bit position. The row dimension of the BRM relates to the range of possible magnitude values that can be generated from the valid word list. Each column bit position relates to a segment of the range of angle that the above words similarly can generate. Hence, the existence of a valid word is denoted by turning on a bit position which contains its angle value in the row corresponding to its magnitude. This process and the resulting array configuration is shown schematically in FIG. 4.

Verification of an OCR word read follows by accessing the bit position in the BRM corresponding to the magnitude and angle it yields. The word would be considered valid if the related BRM bit position were ascertained to be in the ON position. The operations required to achieve this verification can easily be accomplished within a real-time constraint, especially since the storage dimensions of the BRM make it conveniently implementable in read only storage.

Clearly, the BRM will verify the existence of any correctly read word. However, special considerations must be taken into account to allow the BRM to perform its associated task of erroneous word discrimination. The high degree of data compaction achieved using the BRM has occurred at the expense of a decrease in the uniqueness with which a word's vector mapping can be represented. It will be recalled, initially, each vector mapping of a word by algebraic definition yielded a unique magnitude/angle data set. The discrete integer magnitude data lent itself well to being isomorphically mapped into the respective row designation of the BRM (FIG. 4). However, the angle data which originally took the form of a continuum (noninteger) cannot be so directly accommodated in the BRM configuration.

To allow representation in a BRM, the angle data must be quantized into range segments compatible with the limited number of row entries offered by any reasonable length bit string.

This causes the angle part of the vector mapping scheme to have a degree of nonuniqueness associated with it in the BRM representation. Unless certain analytical safeguards are taken, the ambiguity associated with angle may compromise the BRM's error word discriminatory potential. This would make the BRM unable to discern and discriminate those erroneous words which have generated, by chance, a valid magnitude and come sufficiently close to a valid angle value to access the same BRM bit position as a valid word. This possibility can never be precluded entirely; it can however, be made negligibly small by setting up the BRM to take full advantage of the sparse areas of the matrix.

Sparsity can be considered almost synonymous with BRM error word discrimination potential. The basic idea of sparseness is to take advantage of the fact that the BRM contains many more empty ("0") positions than occupied ones ("1"). Logically, it follows, the greater the sparseness the less likely the false verification of error words and therefore the greater the verification discriminatory potential of the BRM methodology. The following strategy is used to exploit the sparseness of the BRM.

Specialization of the BRM Vector Numbering Scheme

The alphanumeric equivalency scheme used to map the valid word list into a vector representation, which in turn is synthesized into the BRM, takes advantage of the known dictionary and OCR misread characteristics. With a properly chosen scheme, one can maximize the potential that when an error occurs, the word falsely generated by the OCR will be rejected as invalid by the BRM. To accomplish this, there are two general restrictions which must be placed on the numbering scheme.

1. The numbering scheme must be chosen such that the density of the matrix is not uniform, and that a continuous, sparse area of the matrix is identifiable.
2. The numbering scheme must be chosen such that invalid words generate magnitude/angle representations which are located in the sparse area of the matrix.

Figure 2:
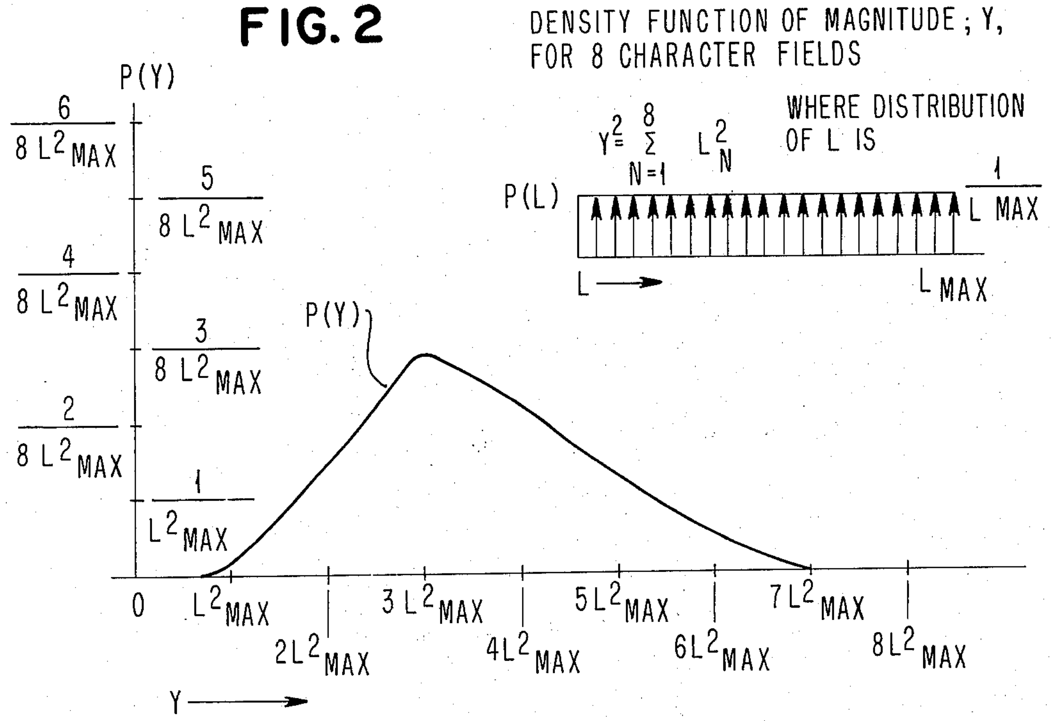
FIG. 2 is a graph of the density function of the magnitude for eight character fields.
Figure 3:
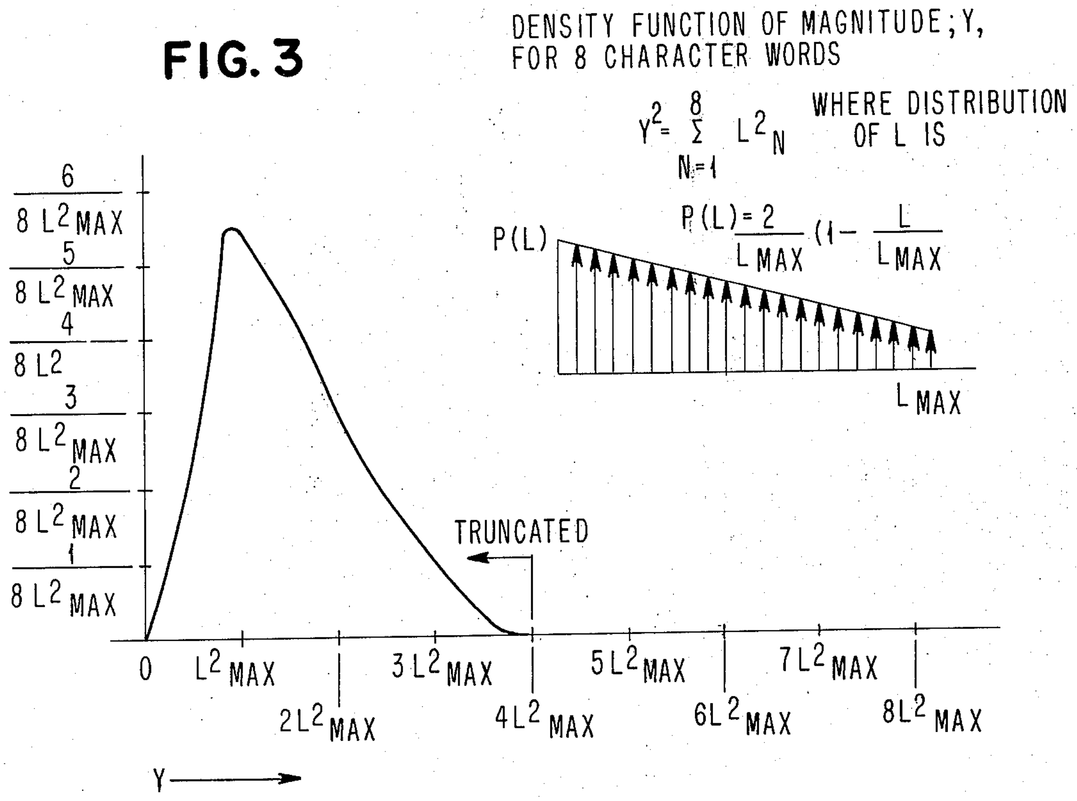
FIG. 3 is a density function of the magnitude for eight character words.
Figure 5:
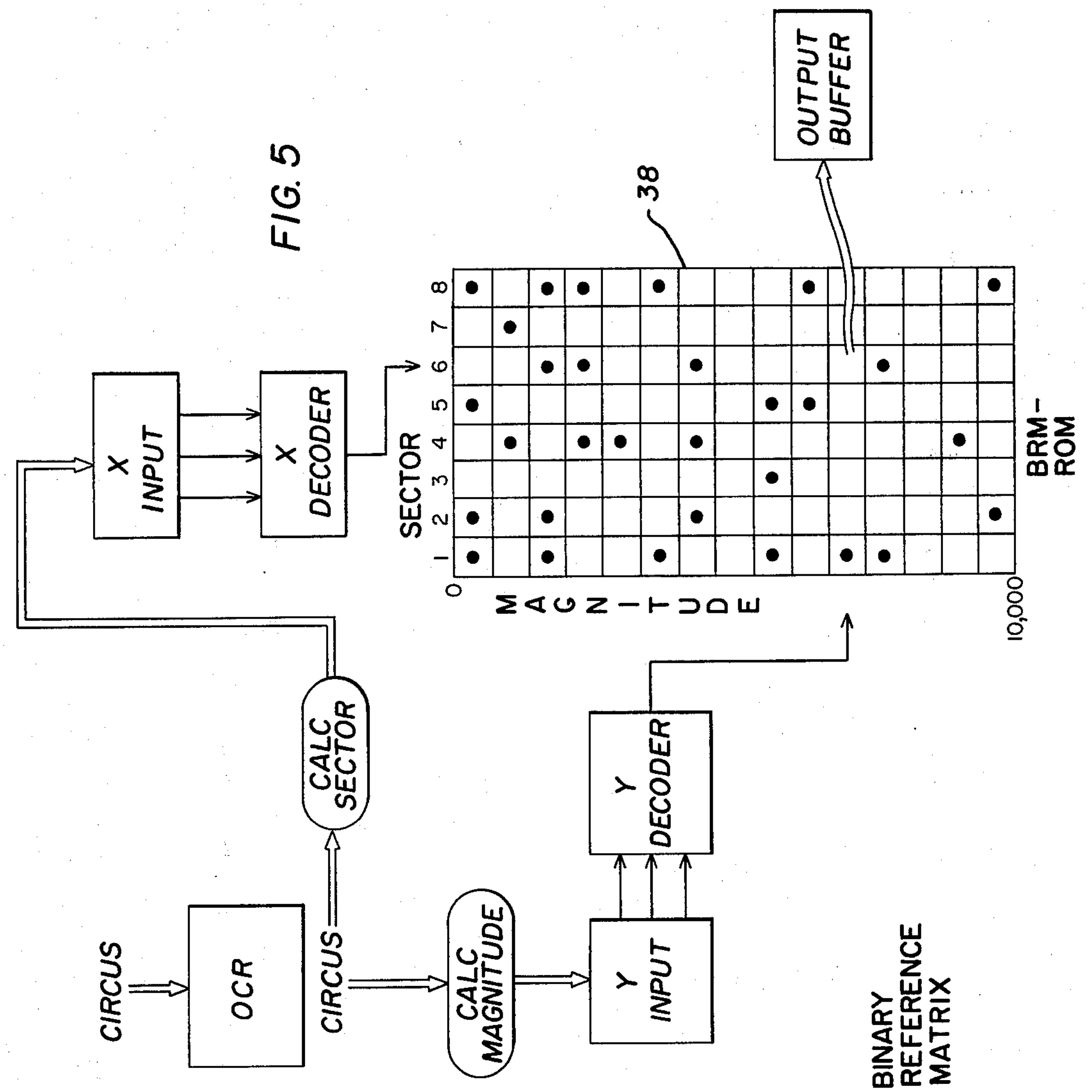
FIG. 5 is a data flow diagram of the binary reference matrix apparatus showing a simulated map of the organization of the read only storage 38.

Restriction (1): To some degree the generation of magnitude, itself, will produce a nonuniformity in the BRM with identifiable areas of sparsity. As an example, FIG. 2 shows the magnitude density function for all combinations of eight character fields where each of the 26 characters has an equal probability of occurrence. Magnitude values cluster toward the center of the range with sparse areas toward the low and high ends of magnitude. However, words in the English language do not have uniform character usage. Rather, character usage varies from approximately 10% (E) to as little as 0.1% (Q). By assigning numerical values to characters in inverse order to their probability of occurrence, the density function can be substantially shifted such that the lower magnitude portion of the matrix has the highest density with the higher magnitude values becoming progressively more sparse. For example, if the characters are ordered according to occurrence frequency and assigned numerical values in sequence starting with 1, the resulting density function can be approximated by the function, as shown in FIG. 3, as:

$$P(L) = \frac{2}{L_{max}}\left(1 - \frac{L}{L_{max}}\right)$$

When this density function is transformed by the magnitude function $$Y^2 = \sum_{N=1}^{M} L_N^2$$

for eight character words (M=8) the resulting magnitude density function (FIG. 2) is heavily populated in the lower portions of the matrix and increasingly sparse at the higher values of magnitude. In fact, for the case of English words the probability of having an occupied matrix position above ½ the maximum possible value of magnitude ($8L_{max}^2$) is essentially zero. In practice the BRM is truncated for values above $4L_{max}^2$. For the remainder of the matrix the majority (85%) of the legal words are represented by values below $2L_{max}^2$; while the region between $2L_{max}^2$ and $4L_{max}^2$ has a high degree of sparsity.

In order to meet the first condition, only, for a BRM numbering scheme, the optimum solution would occur when the characters are assigned numerical values in inverse order to their probability of occurrence, P(αj) in the dictionary of valid words. This may be expressed as:

$$\cdots < L_{k-1} < L_k < L_{k+1} < \cdots \quad (1)$$

$$\cdots > P(a_{k-1}) > P(a_k) > P(a_{k+1}) > \cdots \quad (1')$$

Restriction (2): The restriction that words garbled by the OCR generate magnitude/angle representations in the sparse area of the matrix can be satisfied by placing two conditions on the numbering scheme.

a. Since unreliable words are made up of unreliable characters, if such (easily misread) characters are assigned high values, the words which contain these characters will have high magnitude values. By this method reliable words will cluster in dense areas of the matrix and unreliable words will tend to be found in sparse areas. For this purpose the designation of numbers would best be made by ordering characters in accordance with their reliability and assigning the numerical values in sequence starting with "1". Stated another way, the characters should be ordered according to their unreliability and assigned numbers in inverse sequence starting with $L_{max}$. This condition may be expressed as follows:

$$\text{Unreliability} = \sum_{\alpha_i \neq a_{dict.}}^{\alpha_{26}} P(\alpha_i | a_{dict})$$

where $a_{dict}$ is a particular input character and $\alpha_i$ is one of the possible output characters falsely generated by the OCR. Therefore, $$\cdots < L_{k-1} < L_k < L_{k+1} < \cdots \quad (2)$$

where $$\cdots < \sum_{i \neq k-1}^{26} P(\alpha_i | a_{k-1}) < \sum_{i \neq k}^{26} P(\alpha_i | a_k) < \sum_{i \neq k+1}^{26} P(\alpha_i | a_{k+1}) < \cdots \quad (2')$$

b. The condition expressed in equations (2) and (2') will cause unreliable words to map into the sparse upper magnitude portions of the matrix. However, this alone, is not sufficient to assure that garbled words will map into sparse areas of the matrix. For example, it is possible for an unreliable character to be falsely read into a reliable character and cause the resulting false version of an unreliable word to be mapped into a lower portion of the matrix. What this probability indicates is that there are actually two measures of unreliability. One is for the dictionary word and is expressed by that portion of the character transfer function defined as:

$$\sum_{\alpha_i \neq a_{dict}}^{\alpha_{26}} P(\alpha_i | a_{dict})$$

The other is the unreliability associated with characters in the word as read by the OCR. This measure may be expressed by that portion of the character transfer function $$\sum_{a_j \neq \alpha\text{output}}^{a\,26} P(a_j | \alpha\text{output})$$

where $\alpha_{output}$ is a particular output character, incorrectly read by the OCR and $a_j$ is one of the possible input characters which caused this read.

It should be noted that these two measures of unreliability are by no means equal for a particular character.

It is necessary, then, to formulate a third condition on the assignment of numerical values to characters. The purpose of this condition is to give high values to those characters in the OCR output which have a high probability of having been misread from other characters. This condition may be expressed as follows:

$$\cdots < L_{k-1} < L_k < L_{k+1} < \cdots \quad (3)$$

where $$\cdots < \sum_{j \neq k-1}^{26} P(a_j | \alpha_{k-1}) < \sum_{j \neq k}^{26} P(a_j | \alpha_k) < \sum_{j \neq k+1}^{26} P(a_j | \alpha_{k+1}) < \cdots \quad (3')$$

The condition expressed in (3) and (3') will tend to cause words, incorrectly read by the OCR, to map into higher values of magnitude than their original dictionary version.

Alphanumeric Equivalency Using all Assignment Conditions

The three conditions expressed in equations (1) and (1'), (2) and (2'), and (3) and (3') are not necessarily compatible with one another when based statistically on English dictionary words and normal OCR transformation characteristics. A character, such as *i*, has a relatively high occurrence rate but is also highly unreliable. The numbering scheme based on equations (1) and (1') would be substantially different than that based on equations (2) and (2') or (3) and (3'). It is necessary, therefore, to define some character measure which will reflect the character's ranking when all three conditions are considered simultaneously. Such a ranking will not be optimum for any one condition. However, the total effect when used in word verification with the BRM should be to map incorrectly read words into a sparse region of the matrix.

Condition (1) implies that a character should have a high numerical assignment if its occurrence rate, $P(a_j)$, is low. This may be restated to require that character, $a_j$, have a low numerical assignment if $1/P(a_j)$ is small.

Conditions (2) and (3) imply that a character have a high numerical assignment if its unreliability is high. This unreliability is defined differently for dictionary words than for OCR output words. It is possible to define an average measure of unreliability for a character based on both conditions. This average measure is expressed as:

$$\overline{U} = \sum_{\alpha_i \neq a_{dict}}^{\alpha^{26}} P(\alpha_i | a_{dict}) \frac{P(a_{dict})}{P(\alpha_{output}) + P(a_{dict})} + \sum_{a_j \neq \alpha_{output}}^{a\,26} P(a_j | \alpha_{output}) \frac{P(\alpha_{output})}{P(\alpha_{output}) + P(a_{dict})} \quad (4)$$

where $a_{dict}$ is a particular input character and $\alpha_{output}$ is the correct OCR output for this character.

For any large data sample the $P(a_{dict})$ is approximately equal to the $P(\alpha_{output})$. Equation (4) may, therefore, be simplified $$U = \frac{\sum_{\alpha_i \neq a_{dict}}^{\alpha} P(\alpha_i | a_{dict}) + \sum_{a_j \neq \alpha_{output}}^{a^{26}} P(a_j | \alpha_{output})}{2}$$

Combining condition (1) with conditions (2) and (3), it is evident that a character should be assigned a high numerical value if both $1/P(a_j)$ and $\overline{U}$ are high, and conversely a low value if $1/P(a_j)$ and $\overline{U}$ are low. The product of these two measures is, therefore, a meaningful condition by which to assign numerical values. The resulting expression for the assignment of numerical values could then be:

$$\cdots\cdot < L_{k-1} < L_k < L_{k+1} < \cdots\cdot\cdot \quad (6)$$

where $$\cdots\cdot < \frac{\overline{U_{k-1}}}{P(a_{k-1})} < \frac{\overline{U_k}}{P(a_k)} < \frac{\overline{U_{k+1}}}{P(a_{k+1})} < \cdots\cdot\cdot \quad (6')$$

It should be noted that the conditions of equations (6) and (6') apply for any uniform numbering sequence (not just 1 to 26) which runs from $(L_{max})/Z$ to $L_{max}$; where Z is the number of characters in the alphabet and $L_{max}$ is the maximum numerical value in the sequence.

Also, since equations (6) and (6') only indicate an ordering of the characters, it is possible to select values which are not uniformly separated in numerical sequence. This causes a deviation from the statistical model by which the conditions were derived, but in practice it permits shifting of numerical assignments where empirical data indicates potential improvement in performance.

Table 2 shows the alphanumeric equivalency scheme that was used for a dictionary of 15,000 words. In this case $L_{max}$ is 60 and the spacing of numerical values is non-uniform.

SPECIFIC DESCRIPTION OF THE INVENTIVE APPARATUS

The binary reference matrix apparatus is shown in FIG. 4. A combined alphanumeric stream output from a character recognition machine is input over line 2 to the system of FIG. 4. A word separation detector 4 connected to the input line 2 detects for the existence of a word separation symbol indicating the commencement of a new word. Since both alphabetic and numeric characters are on the output reco-stream from the character recognition machine, the numeric detector 6 connected to the input line 2 detects whether an input character is an alpha or a numeric character. Numeric detector 6 activates gate 8 which allows only alphabetic characters to pass to the conversion read only storage 10. The conversion read only storage 10 contains the alphanumeric equivalency scheme disclosed in Table 2 which relates the alphabetic characters with weighted numerical values as determined by the technique disclosed above. The numerical weighting value for a character "N" is designated $L_n$. The conversion read only storage 10 outputs the value $L_n$ on the data bus 11.

Table 2

| COMMON SUBSTITUTIONS | | | | | |
|---|---|---|---|---|---|
| E | → | F | B | → | E |
| 1 | → | L | h | → | n |
| M | → | N | G | → | C |

| NUMBER SELECTION | | | |
|---|---|---|---|
| A | 10 | n | 1 |
| B | 17 | O | 20 |
| C | 35 | P | 30 |
| D | 11 | Q | 55 |
| E | 4 | R | 2 |
| F | 45 | S | 6 |
| G | 24 | T | 18 |
| H | 25 | U | 23 |
| I | 60 | V | 40 |
| J | 13 | W | 15 |
| K | 28 | X | 16 |
| L | 3 | Y | 21 |
| M | 50 | Z | 21 |
| | | b | 22 |

The first-dimensional accessing means for addressing individual bit positions in the read only storage 38 comprises the multiplier 12, the adder 14, the register 16 and the magnitude register 17. The value of $L_n$ input on the data bus 11 is squared in the multiplier 12 and added to the sum of previous squared values of $L_n$ in the alpha word under analysis by the adder 14 and register 16. The process of calculating the value of the sum of $L_n^2$ continues until the word separation detector 4 detects the next word separation symbol input on the input line 2. At this time the final value of the sum of $L_n^2$ is loaded into a magnitude register 17 as the first-dimensional address for an individual bit position in the read only storage 38, based upon the values $L_n$ assigned to the characters of which the input alpha word is composed.

The second-dimensional accessing means for the read only storage 38 comprises the counter 18, multiplier 20, adder 22, register 24, multiplier 26, divider 28, arcsecant in Table 29, multiplier 30, adder 32, register 34 and square root calculator 36. The counter 18 counts the number of characters in each alpha word processed by the apparatus. Counter 18 outputs the present character count to the multiplier 20. The value of $L_n$ on data bus 11 is input to the multiplier 20 and multiplied times the present character count and the product is input to the adder 22. Adder 22 and register 24 maintain the running sum of the products of $L_n$ times the count N for the alpha word under analysis. When the word separation detector 4 detects the next word separation symbol on the input line 2 register 24 outputs the final sum of $L_n$ times N to the divider 28. The present character count is output from the counter 18 to the multiplier 30 generating the value $n^2$ which is output to the adder 32.

Adder 32 and register 34 maintain a running sum of the squares of $n$ and when the word separation detector 4 detects the next separation symbol in the input stream 2, the final sum of $n^2$ is output to the square root calculator 36. The square root calculator 36 takes the square root of the sum of the $n$ squares yielding the value R which is input to the multiplier 26. Multiplier 26 multiplies the value of the magnitude sum of $L_n^2$ times the magnitude of R from the square root calculator 36 and outputs the product as the numerator to the divider 28. The value of sum of the $L_n$ times N which is input from register 24 to the divider 28 serves as the denominator and the quotient is output to the arcsecant Table 29. The angle value output from the arcsecant Table 29 is the second-dimensional address or index which addresses an individual bit position in the read only storage 38 based upon the relative position of the characters of which the input alpha word is composed.

The read only storage 38 is a two-dimensional read only storage binary array, each bit position of which has the potential to represent a valid linguistic expression. The read only storage 38 is accessed by the first-dimensional accessing means and the second-dimensional accessing means. The read only storage 38 has an organization which is based upon the character transfer function of the character recognition machine whose output stream is being analyzed. The population of the read only storage matrix is rendered more sparse for bits representing alpha words having a higher probability of being confused into a false output word, as was described in the theory of operation. When the first-dimensional magnitude address and the second-dimensional angle address access a particular location in the read only storage 38, there is output a one bit signal to the one bit detector 40 which indicates whether a proper match has been made between the dictionary of valid linguistic expressions stored in the read only storage 38 and the alphabetic word input on the input line 2. This go/no go signal from the one bit detector 40 is output on line 44 for further post-processing applications.

It is seen that the binary reference matrix apparatus disclosed enables the detection of erroneous alpha words output from a character recognition machine in a more efficient manner and with less storage space and ancillary hardware, than was available in the prior art.

The binary reference matrix apparatus shown in FIG. 4 can be applied to post-processing the phonema-character recognition stream output from a speech analyzer. Speech analyzers, such as is disclosed in U.S. Pat. No. 3,646,579 to Griggs, analyze continuous human speech into component phoneme-character units. Phoneme-character misreads occur with sufficient frequency in state of the art speech analyzers, that the need exists for means to detect analysis errors in spoken word recognition. The subject binary reference matrix apparatus can be used to detect spoken words output in the recognition stream of a speech analyzer. In the system shown in FIG. 4, the input line 2 is the phoneme-character output line from a speech analyzer, carrying the phoneme-character recognition stream. The conversion read only storage 10 contains a phoneme/numeric equivalency scheme similar to that shown in Table 2 for the alpha numeric equivalency scheme in optical character recognition. The read only storage 38 is a binary array, each bit position of which has the potential to represent a valid linguistic expression. The read only storage 38 is organized so as to minimize the size of the array needed for accurate verification similarly to that described for optical character recognition above. The population of the matrix in the read only storage 38 is rendered more sparse for bits representing spoken words having a higher probability of being confused into a false output word. The read only storage 38 has its memory organization based upon the character transfer function of the speech analyzer whose output stream is being analyzed.

The binary reference matrix apparatus shown in FIG. 4 can also be applied to post-processing, common typographical errors committed on a standard keyboard. In the system shown in FIG. 4, the input line 2 is connected to the data transmission line from the keyboard. The conversion read only storage 10 contains in alpha numeric equivalency scheme similar to that shown in Table 2 for optical character recognition above. The read only storage 38 is organized so it is based upon character transfer function for conventional keyboard errors so that the population of the matrix in the read only storage 38 is rendered more sparse for bits representing typed words having a higher probability of being confused into a false output word.

While the invention has been particularly shown and described with reference to the preferred embodiments thereof it will be understood by those skilled in the art that the foregoing and other changes in form and detail may be made therein without departing from the spirit and scope of the invention.

I claim:

1. A binary reference matrix apparatus for verifying input alpha words as valid linguistic expressions, from an OCR having a character transfer function, comprising:

detection means for detecting an alpha word at the input of said apparatus;

conversion means connected to said detection means for assigning numeric values to the characters in the input alpha word based upon the OCR read reliability of the characters;

a first-dimensional bit address calculation means connected to said conversion means for calculating a first-dimensional bit address as a vector magnitude $$Y^2 = \sum_{N=1}^{M} L_N^2$$

of the input word where $L_N$ is the numeric value assigned to each alpha character in the input word by said conversion means;

a counter connected to said detection means for counting the number of characters in the input alpha word;

a second-dimensional bit address calculation means connected to said counter and said conversion means for calculating a second-dimensional bit address as a vector angle arcsecant $$|Y|\,|R| \sum_{N=1}^{M} L_N N$$

of the input words, where N equals 1, 2, 3, etc., for each character position in the word and $$R^2 = \sum_{N=1}^{M} N^2;$$

a two-dimensional read only binary array containing bit addresses representing valid linguistic expressions organized to minimize the size of the array needed for accurate verification by choosing numeric values of the alpha characters in inverse proportion to the characters' OCR read reliability;

a first-dimensional accessing means connected to said first-dimensional address calculation means and said two-dimensional read only binary array for accessing said binary array at a bit address equal to the calculated first-dimensional bit address;

a second-dimensional accessing means connected to said second-dimensional bit address calculation means and said two-dimensional read only binary array for accessing said binary array at a bit address equal to the calculated second-dimensional bit address; and indicator means connected to said two-dimensional read only binary arrary for indicating whether the bit at the calculated bit address in said two-dimensional binary array is on or off and correspondingly whether the input alpha word is valid or invalid.

2. A binary reference matrix apparatus for verifying input alpha words as valid typographical expressions, from a keyboard having a character transfer function, comprising:

detection means for detecting an input alpha word at the input of said apparatus;

conversion means connected to said detection means for assigning numeric values to the characters in the input alpha word based upon the characters' keyboard typographical reliability;

a first-dimensional bit address calculation means connected to said conversion means for calculating a first-dimensional bit address as a vector magnitude $$Y^2 = \sum_{N=1}^{M} L_N^2$$

of the input word, where $L_N$ is the numeric value assigned to each alpha character in the input word by said conversion means;

a counter connected to said detection means for counting the number of characters in the input alpha word;

a second dimensional bit address calculation means connected to said counter and said conversion means for calculating a second-dimensional bit address as a vector angle arcsecant $$|Y|\,|R| \sum_{N=1}^{M} L_N N$$

of the input word, where N equals 1, 2, 3, etc., for each position character in the word and $$R^2 = \sum_{N=1}^{M} N^2;$$

a two-dimensional read only binary array containing bit addresses representing valid typographical expressions organized to minimize the size of the array needed for accurate verification by choosing numeric values of the alpha characters in inverse proportion to the characters' keyboard typographical reliablity;

a first-dimensional accessing means connected to said first-dimensional address calculation means and said two-dimensional read only binary array for accessing said binary array at a bit address equal to the calculated first-dimensional bit address;

a second-dimensional accessing means connected to said second-dimensional bit address calculation means and said two-dimensional read only binary array for accessing said binary array at a bit address equal to the calculated second-dimensional bit address; and indicator means connected to said two-dimensional read only binary array for indicating whether the bit at the calculated bit address in said two-dimensional binary array is on or off and correspondingly whether the input alpha word is valid or invalid.

3. A binary reference matrix for verifying input alpha words as valid linguistic expressions, from a speech analyzer having a character transfer function, comprising:

detection means for detecting a phoneme alpha word at the input of said apparatus;

conversion means connected to said detection means for assigning numeric values to the characters in the input phoneme word based upon the characters' speech analyzer read reliability;

a first-dimensional bit address calculation means connected to said conversion means for calculating a first-dimensional bit address as a vector magnitude $$Y^2 = \sum_{N=1}^{M} L_N^2$$

of the input word, where $L_N$ is the numeric value assigned to each phoneme alpha character in the input word by said conversion means;

a counter connected to said detection means for counting the number of characters in the input phoneme alpha word;

a second-dimensional bit address calculation means connected to said counter and said conversion means for calculating a second-dimensional bit address as a vector angle arcsecant $$|Y|\,|R| \sum_{N=1}^{M} L_N N$$

of the input word, where N equals 1, 2, 3, etc., for each character position in the word and $$R^2 = \sum_{N=1}^{M} N^2;$$

a two-dimensional read only binary array containing bit addresses representing valid linguistic expressions organized to minimize the size of the array needed for accurate verification by choosing numeric values of the phoneme alpha characters in inverse proportion to the characters speech analyzer read reliability;

a first-dimensional accessing means connected to said first-dimensional address calculation means and said two-dimensional read only binary array for accessing said binary array for a bit address equal to the calculated first-dimensional bit address;

a second-dimensional accessing means connected to said second-dimensional bit address calculation means and said two-dimensional read only binary array for accessing said binary array at a bit address equal to the calculated second-dimensional bit address; and indicator means connected to said two-dimensional read only binary array for indicating whether the bit at the calculated address in said two-dimensional binary array is on or off and correspondingly whether the input alpha word is valid or invalid.

* * * * *

UNITED STATES PATENT OFFICE
CERTIFICATE OF CORRECTION

Patent No. 3,925,761 Dated December 9, 1975

Inventor(s) Anne Marie Chaires et al.

It is certified that error appears in the above-identified patent and that said Letters Patent are hereby corrected as shown below:

Column 12, line 8, after "|R|" insert -- / --.

Column 12, line 68, after "|R|" insert -- / --.

Column 14, line 13, after "|R|" insert -- / --.

Figure 4, between "MAGNITUDE REGISTER 17" and MULT 26" insert a dashed block labelled -- SQUARE ROOT --.

Signed and Sealed this

Twelfth Day of October 1976

[SEAL]

*Attest:*

RUTH C. MASON
*Attesting Officer*

C. MARSHALL DANN
*Commissioner of Patents and Trademarks*